Sept. 23, 1958 S. G. SHAND 2,853,269
GATE VALVES
Filed Sept. 2, 1954 2 Sheets-Sheet 1

INVENTOR
Stanley Grapes Shand
BY G.E.Odell
ATTORNEY

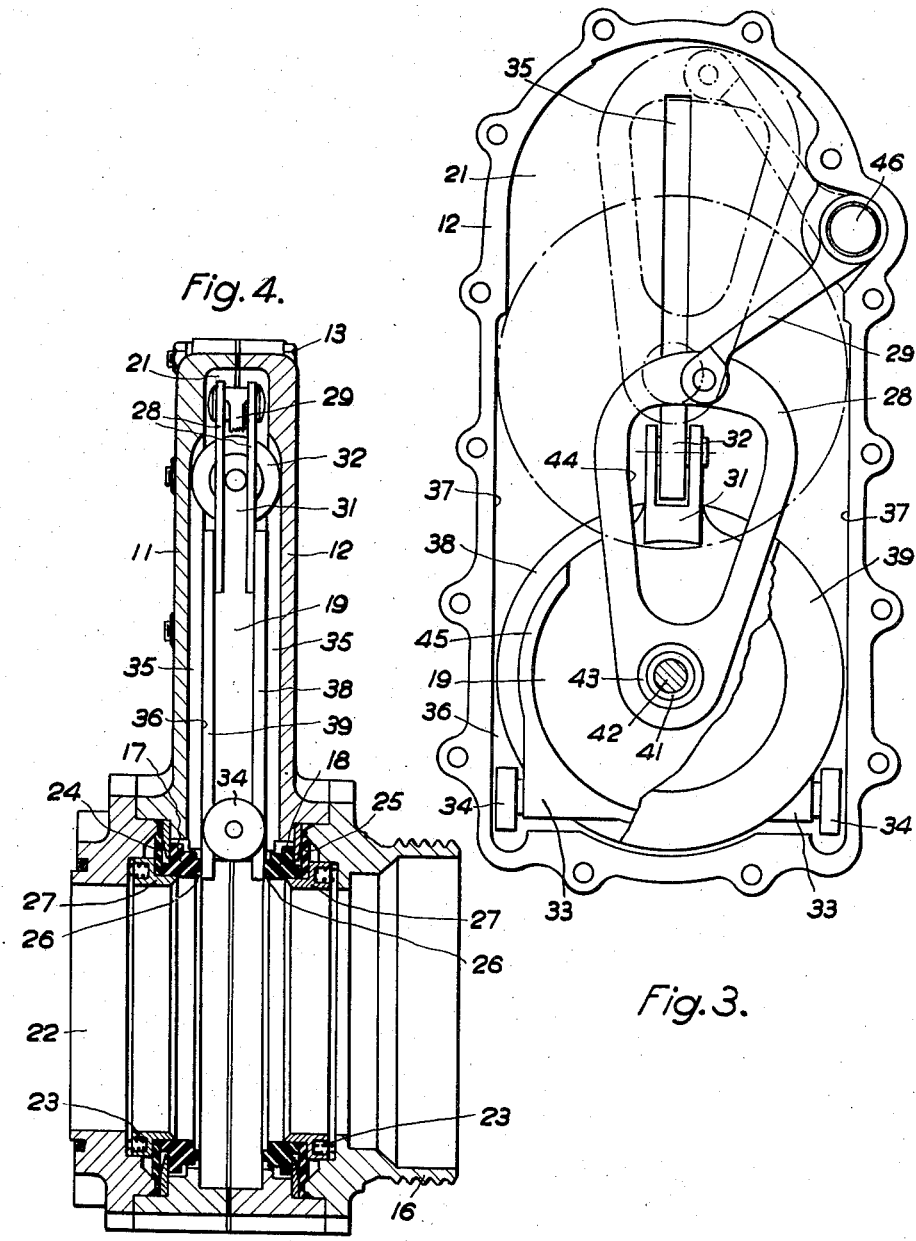

United States Patent Office 2,853,269
Patented Sept. 23, 1958

2,853,269

GATE VALVES

Stanley G. Shand, Hereford, England, assignor to Saunders Valve Company Limited, Newport, England, a British company Application September 2, 1954, Serial No. 453,916

Claims priority, application Great Britain September 5, 1953

7 Claims. (Cl. 251—327)

This invention relates to gate valves for the control of fluids.

A purpose of the invention is better to enable such a valve to be used under certain difficult conditions, particularly abnormal pressures and large changes of temperature, and in cases where it is difficult to provide high operating forces. By way of example fuel lines on aircraft may be instanced. In such cases pressures are sometimes developed in the pipe lines or within the valve which could lead to excessive stresses in the valve structure, which must be of light weight, such pressures arising through dynamic effects or through the very long temperature range through which the equipment may rapidly pass, when the expansion of trapped liquid may occur. Also the necessity to save weight puts a high premium on the use of light operating forces because the valves are usually in inaccessible positions and therefore have to be operated through linkages or by local electrical equipment, and space and weight can ill be spared.

In a gate valve a considerable area of the gate is exposed to fluid pressure and it is pressed correspondingly firmly against the means which guide it in the body of the valve. If the contact is a rubbing one, friction reaches a correspondingly high value and the load imposed on the operating mechanism is correspondingly high.

To reduce the forces necessary to move the gate in such a valve, according to the invention the gate is provided with rollers which can contact with and run on surfaces in the valve body on either side of the gate according to the direction in which the preponderance of fluid pressure acts on the gate, the rollers being at all times outside the clear bore in the valve body, so that they do not obstruct the flow.

Desirably the rollers are carried by a spider while the gate itself is circular and is rotatably attached to the spider so that if it moves laterally in either direction the gate itself can roll on either of the two lateral surfaces provided for it in the valve body close to its central position.

Preferably resilient packing is provided on both sides of the gate, in which case the spider is accommodated within the thickness of the gate, to leave both surfaces of the gate clear, and the pressure of the resilient packing is provided by springs so that the packing serves as a safety valve in the case of excessive fluid pressure. To provide a further measure of safety in this respect the fluid pressure may be arranged to act on the packings against the spring action, i. e. to urge the packings away from the gate.

The invention will be further described with reference to the accompanying drawings, in which:

Figure 3 is a front view taken from the opposite side to Figure 1 and with one half of the valve body removed, Figures 2 and 3 showing the valve closed, and Figure 4 is a section showing the valve open.

Figure 1:
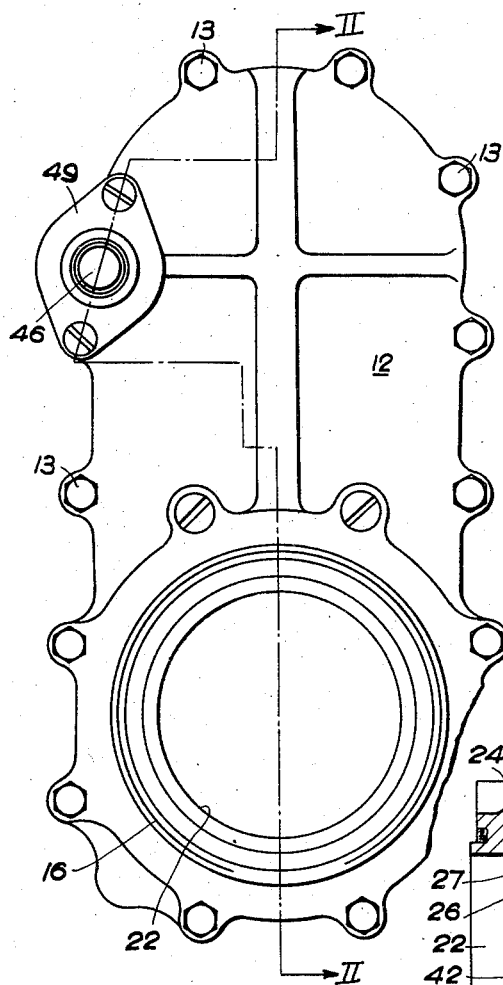
Figure 1 is a front view of one preferred construction of valve according to the invention.
Figure 2:
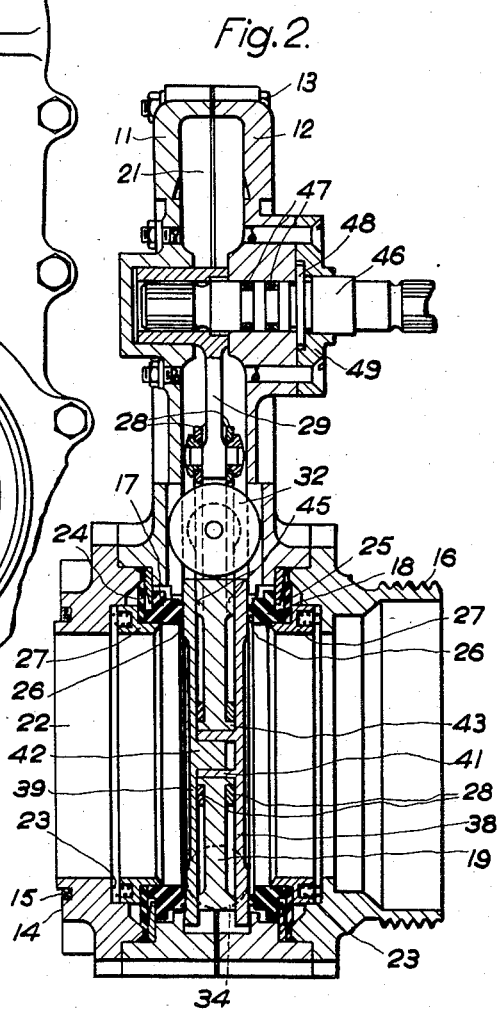
Figure 2 is a section on the line II—II of Figure 1.

The valve illustrated has a body made up of two halves 11, 12 bolted together round the periphery as at 13 and provided with suitable means for inclusion in a pipeline, here exemplified by a facing 14 with packing ring 15 on one side, and a screwed spigot 16 on the other.

The gate co-acts with packing rings 17, 18, surrounding the valve bore 22, one on each side. To permit this the gate is made hollow and a spider 19 to which the gate is pivoted, is accommodated within the thickness of the gate. The packing means is arranged so that the joint is made on the upstream side when the valve is closed, and when the valve is open liquid can pass round and through the gate and into the operating space constituted by a transverse passage 21 crossing the valve bore 22. If liquid were trapped here at a low temperature and were then expanded through a rise in temperature, dangerous stresses could easily arise. To avoid this packing means are used in which the sealing pressure is provided by springs 23 only. This automatically releases any pressure above a certain value and therefore avoids excessive stresses due to temperature effects. It equally avoids excessive stresses due to excessive pressures in the pipeline. Thus the valve constitutes its own safety valve in these cases and all the pressure relief is within the valve and not to the outside of the valve body itself. Generally one or the other side of the pipeline is connected to a space open to the atmosphere and it will be at this point that the ultimate pressure relief takes place.

A particularly desirable form of packing is on the lines of that disclosed in Patent No. 2,751,185 granted June 19, 1956 in connection with plug cocks and also applicable to gate valves and wherein the fluid pressure has access in effect to both sides of the diaphragm by which a packing ring is sealed to the valve body, so that the net fluid pressure effect is reduced to zero and the sealing pressure is supplied by springs. Thus as shown sealing rings 17, 18 are carried by respective diaphragms 24, 25 sealed to the valve body halves and the fluid pressure on the back of the diaphragm tending to press the ring against the gate is counterbalanced by the provision of a counterbore 26 in the ring to which the fluid pressure has access. By suitably dimensioning the counterbore, it can be arranged that the net effect of the fluid pressure is to press the ring away from the gate, the joint-making pressure being the difference between this fluid pressure and the pressure of the spring. Since fairly strong spring pressure is necessary in such cases it is preferred to use a series of springs 23 acting through metal rings 27.

Since the gate has to be made hollow and the presence of the spider 19 has to be allowed for, to operate the valve the spider is linked by a connecting rod 28 to a crank arm 29, both within the thickness of the gate. For convenience the connecting rod as well as the spider is pivoted on the central axis of the gate.

As shown, the spider is here of three-armed form with one arm 31 projecting along the mid-lines of the passage 21 towards the operating mechanism and the connecting rod is shaped to clear the arm of the spider while allowing for the slight angular oscillation of the connecting rod during the opening and closing movement.

The arm 31 carries a roller 32 while the other two arms 33 project laterally and each carries a roller 34. Conveniently, the arm 31 is bifurcated with the roller 32 between the limbs while the rollers 34 are carried on pins formed integrally with the arms 33. It will be seen that all three rollers are at all times outside the bore 22 and all are pivoted on axes parallel with the faces of the gate and transverse to the length of the passage 21.

The guide faces in the valve body for the rollers are spaced sufficiently more than the diameters of the rollers to ensure that when the gate is thrown over to one side or the other according to the preponderance of the fluid pressure, each roller bears on one surface only and is clear of the other. The clearance required is minute and is desirably kept at this low value to limit the movement of the gate from one side to the other and the clearance is therefore not perceptible in the drawings.

Tipping of the spider about the axes of the gate can be prevented or limited by allowing one or more of the rollers to run in grooves in the body of the valve. As shown, the central roller 32 runs in such grooves, indicated at 35. This roller is accordingly of substantially greater diameter than the thickness of the gate but the other two rollers 34 need be and are only a fraction greater in diameter than the thickness of the gate, the surfaces 36 in the body on which they can run just clearing the gate. The illustrated example also shows a particularly convenient way to pivot the gate so that it can roll on one or other of two parallel lateral surfaces 37 in the valve body. In the illustrated construction the gate is made up of two discs 38, 39, one having a central socket 41 and the other a central spigot 42, the outer surface of the socket constituting a bearing surface for the spider 19 which has a flange 43 serving as a bearing for the connecting rod 28. The connecting rod is of duplicate form, both at this end and at the upper end where it embraces and is pivoted to the arm 29. It could be in one piece, with bifurcated or slotted ends, but it is simpler to make it wholly duplicate, i. e. as two parallel plates. The connecting rod also has a more or less triangular slot 44 to provide the necessary clearance for the roller 32 and spider arm 31. Towards the periphery of the gate the spider is thickened, as at 45, to maintain the correct spacing of the two discs 38, 39. No constraint against separation of the discs is required, as they are restrained and indeed pressed towards one another by the seating rings 26.

The crank arm 29 is fast on a shaft 46 which is laterally journalled in and projects from the body to receive any convenient operating means such as an arm or gear wheel. The shaft 46 is packed at 47 to prevent leakage past it to the outside of the body. As the valve seals on the upstream side, when the valve is closed it is possible to re-pack the shaft 46 without dismantling the valve or emptying the pipeline. To permit this the attachment of the crank arm 29 to the shaft is arranged to permit the shaft to be withdrawn. The shaft is normally retained by the aid of a flange 48 and a cap 49 secured by screws to the body half 12.

I claim:

1. In a gate valve, the combination of a body having a bore therethrough and a transverse passage crossing said bore, gate moving means movable in said transverse passage between two end positions, a gate of circular form rotatably pivoted at its centre to said gate moving means, one extreme position of said gate moving means bringing the gate into the position in which it obturates said bore and the other extreme position bringing the gate into a position in which it substantially clears said bore, and lateral facings in said body for the edge of said gate positioned to enable the gate to roll on either as it moves from one extreme position to the other.

2. In a gate valve the combination of a body having a bore therethrough and a transverse passage crossing said bore, a multi-armed spider movable in said transverse passage between two end positions, mechanism for moving said spider between said end positions, said mechanism being such that lateral forces may be imposed on the spider during its movement, rollers rotatably mounted on the ends of the arms of said spider on axes transverse to said bore and to the direction of movement of the spider, a gate of circular form rotatably pivoted at its centre to said spider whereby it is moved along with said spider, one end position of the spider bringing said gate into a position in which it obturates said bore and the other end position of the spider bringing said gate substantially clear of said bore, faces in said bore on both sides of the gate against either of which said rollers can bear and run, depending on the direction of fluid pressure on the gate, and lateral facings located in said body to constrain lateral movements of said gate and along either of which the gate can roll as the spider moves from one end position to the other.

3. In a gate valve the combination of a body having a bore therethrough and a transverse passage crossing said bore, guide surfaces on both faces of said transverse passage extending along said passage clear of said bore, lateral guide surfaces bounding the sides of said transverse passage and extending clear of said bore, a circular gate in said transverse passage of larger diameter than said bore, the distance between said lateral guide surfaces being such that said gate can roll on either in a path in which in one extreme position it obturates said bore and in another extreme position it is substantially clear of said bore, a multi-armed spider in said transverse passage to which said gate is rotatably pivoted at its centre, rollers at the ends of the arms of the spider rotatably pivoted on axes transverse to said bore and to the length of said transverse passage, said rollers being so located and of such diameter that they can roll on the said guide surfaces on either face of said transverse passage according to the direction in which a preponderance of fluid pressure acts on the gate, and mechanism for moving said spider between positions which carry the gate from one said extreme position to the other without impeding the ability of said gate to roll on either of said lateral guide surfaces.

4. A gate valve structure as set forth in claim 3 wherein the guide surface against which at least one of said rollers can run is formed at the bottom of a groove of such width that the sides of the groove serve to prevent rotation of said spider about the axis on which the gate is pivoted to it without preventing the gate from rolling on either of said lateral guide surfaces.

5. A gate valve structure as set forth in claim 3 wherein said circular gate comprises two discs spaced apart and wherein said mechanism includes a crank arm rockable in said body in a plane parallel with the faces of the gate and a connecting rod linked between the end of said crank arm and the said spider and located between the discs constituting said gate.

6. A structure as set forth in claim 5 wherein said connecting rod is linked to said spider at the centre of said discs.

7. A structure as set forth in claim 5 also comprising a spigot at the centre of one disc and a socket at the centre of the other serving as a bearing for the spigot and being journalled in a bore in said spider, said connecting rod being pivoted at one end to said crank arm and at the other to said spider concentrically with said spigot and socket.

References Cited in the file of this patent

UNITED STATES PATENTS

| | | |
|---|---|---|
| 165,493 | Morse | July 13, 1875 |
| 459,408 | Lunkenheimer | Sept. 15, 1891 |
| 1,801,960 | Houser | Apr. 21, 1931 |
| 1,823,394 | Geiger | Sept. 15, 1931 |
| 2,013,212 | Hollander | Sept. 3, 1935 |
| 2,253,881 | Anderson | Aug. 26, 1941 |
| 2,370,751 | Prager | Mar. 6, 1945 |
| 2,516,411 | Patterson | July 25, 1950 |
| 2,639,117 | Hogard | May 19, 1953 |

FOREIGN PATENTS

| | | |
|---|---|---|
| 405 | Great Britain | Oct. 6, 1896 |
| 503,511 | Belgium | of 1951 |
| 671,546 | Great Britain | Feb. 26, 1951 |